May 12, 1925.

F. BRICKIE

ADJUSTABLE BEARING

Filed Dec. 18, 1923

1,537,655

Inventor
FRANK BRICKIE,
By *Catterley*
Attorney

Patented May 12, 1925.

UNITED STATES PATENT OFFICE.

FRANK BRICKIE, OF SAN FRANCISCO, CALIFORNIA.

ADJUSTABLE BEARING.

Application filed December 18, 1923. Serial No. 681,400.

*To all whom it may concern:*

Be it known that I, FRANK BRICKIE, a citizen of the United States, residing at San Francisco, in the county of San Francisco and State of California, have invented new and useful Improvements in Adjustable Bearings, of which the following is a specification.

My invention has reference, in general terms, to improvements in adjustable bearings of the type wherein adjustment is affected through the instrumentality of multiple, coactive wedging units disposed to lie and be actuated in relatively different planes whereby to prevent slippage and compensate for undue stress and strain exerted by widely varying directions of thrust; and more particularly it is my purpose to provide a bearing assembly which is primarily adapted for use in mounting the side-rods of locomotives.

In order to effectually accomplish the purposes for which my invention is designed I employ a plurality of wedge blocks which are disposed to be actuated by a force exerted axially of a rotatably supported object, and said axial force I supply by other wedging elements disposed to be moved by a force exerted circumferentially of such rotatably supported object. Manifestly therefore any force which would tend to loosen the wedge blocks would be effectually resisted by the circumferentially movable wedging elements, and the action of such circumferentially movable wedging elements with respect to the axially movable blocks will be in the nature of the action of a micrometer—rotational movement translated into an axial or longitudinal adjustment—thereby affording a finer and more accurate adjustment of the brasses forming a part of my bearing assembly.

Furthermore, I have provided means for facilitating the removal of the wedge blocks employed in my assembly, and means for locking the parts of the assembly in an adjusted position whereby to afford a positive simple and effective bearing which permits of adjustment or removal of bearing brasses in a few moments whereas heretofore adjustment or removal of worn side-rod brasses has necessitated the laying up of a locomotive for from one to two days.

To these and other ends, my invention consists in the construction, combination and arrangement of parts described hereinafter and pointed out in the claims.

One embodiment of my invention is represented by way of example in the accompanying drawings, wherein:—

In the drawings wherein like characters of reference designate like or similar parts throughout the several views;—

Figure 1:
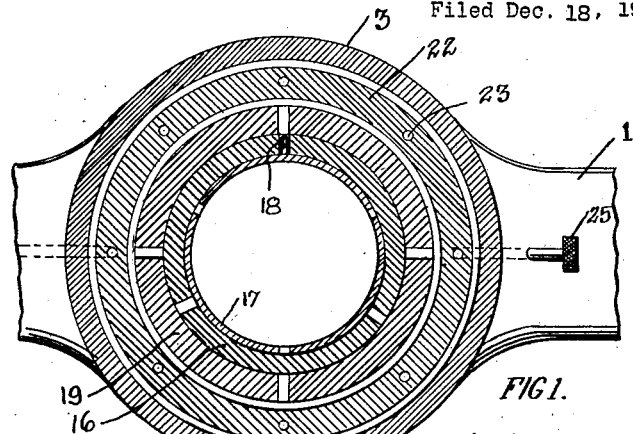
Figure 1 is a transverse section taken through my bearing assembly.
Figure 7:
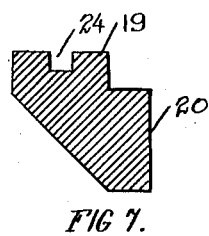
Figure 7 is a section taken through the male element shown in Figures 4 and 6.
Figure 2:
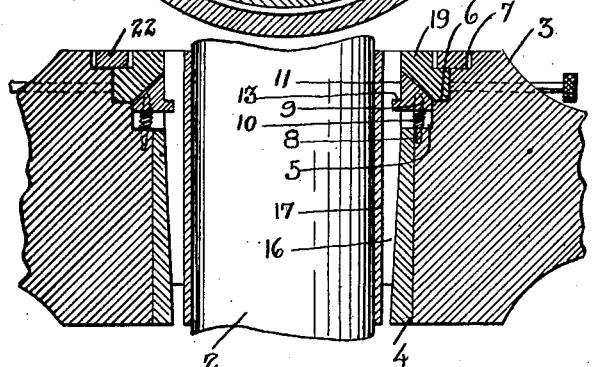
Figure 2 is a vertical section.
Figure 8:
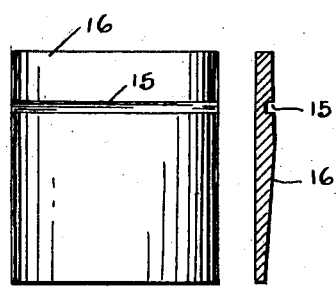
Figure 8 is a view illustrative of one of the axial wedge blocks.
Figure 3:
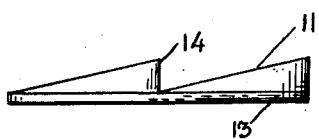
Figure 3 is a side elevation of the female element of my circumferential wedging unit.
Figure 4:
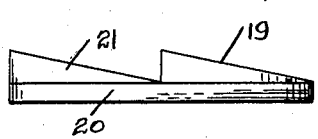
Figure 4 is a side elevation of the male element of my circumferential wedging unit.
Figure 9:
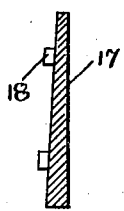
Figure 9 is a sectional view through the bushing member of my device, and shows the lugs which fit between adjacent axial wedging blocks to prevent turning of the same.

The numeral (1) designates a portion of the side-rod of a locomotive, and (2) the pin. The sleeve portion (3) of the side-rod is provided with a cylindrical bushing (4) which is wedge shaped in cross-section as shown in Figure 2, and the body of the rod (1) adjacent the sleeve portion is machined to form three annular lands (5), (6) and (7) respectively; the land (7) being relatively greater in diameter than the other two and being outermost.

Formed in the body of the land (5) are a plurality of openings (8) which are adapted for the reception of pins (9). Mounted on the pins (9) are coil springs (10), and each pin (9) is received in an opening in a female wedge unit (11). The springs (10) function to yieldably support the unit (11). The female wedge unit (11) is formed with an annular base (12), which is flanged as at (13); and rising from the base are a plurality of wedging members or teeth (14). The flange (13) engages in grooves (15) formed in a plurality of arcuate wedge blocks (16) which are mounted at a space apart axially of the pin (2), and engaging the bushing (4), and a plurality of arcuate brasses (17). The brasses are the friction resisting elements of my bearing. Manifestly then, the pressure exerted by the brasses (17) upon the pin (2) may be regulated by adjusting the wedge blocks (16) with respect to the bushing (4), and each brass (17) is provided with lugs (18) which extend between the respective wedge blocks to prevent relative rotational movement. The pins (9) function also to prevent rotational movement of the female member (11).

Figure 5:
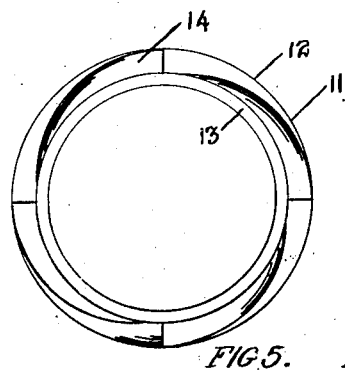
Figure 5 is a plan view of the wedge element shown in Figure 3.
Figure 6:
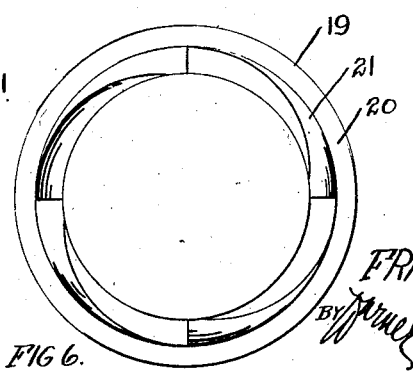
Figure 6 is a plan view of the wedge element shown in Figure 4.

Mounted for movement upon the land (6) in a direction circumferential to the pin (2) is a male wedging unit (19) which is formed with a base (20) and wedging members or teeth (21) which are adapted to ride upon the teeth (14) of the unit (11). Attention is here called to the fact that the teeth (14) and (21) are angular in cross-section so that their meeting faces uniformly decrease in breadth from their bases to their ends (see Figures 5 and 6). Furthermore, it is pointed out that while the unit (19) rides upon the land (6) it overhangs the unit (11) and is held in place by a circular ring (22). Manifestly therefore any circumferential movement in one direction of the unit (19) will be translated into downward movement of the unit (11), against the pressure exerted by springs (10), due to the wedging effect of the teeth (14) and (21). But the unit (11) is operatively associated with the wedge blocks (16) through the medium of the flange (13) which engages in the groove (15) in the blocks, therefore the wedge blocks will be forced in to take up whatever looseness or slack there may be between the brasses (17) and the pin (2). Furthermore, circumferential movement in the opposite direction of the unit (19) will relieve pressure upon the unit (11) which in turn will be forced out by the springs (10) to withdraw the wedge blocks (16).

The ring (22) is preferably held in place by screws (not shown) extending through openings (23) therein so that it may be readily removed to disassemble the bearing for the purpose of replacing worn brasses; and in order to facilitate turning of the unit (19) to adjust the brasses suitable notches (24) are provided therein which are adapted to receive the teeth of a suitable wrench. In order to prevent creeping of the unit (19) I have provided set screws (25) which extend through suitable openings in the body of the rod (1) to bear thereagainst.

While it is believed that the operation of my invention has been made apparent in the foregoing description, it is here desired to emphasize the fact that the relative arrangement of the separate parts of the bearing permits of quick dismounting of worn brasses, and accurate adjustment of serviceable brasses to take up such slack as may be indicated, thereby affording an exceptionally desirable bearing assembly for rapidly rotating parts under great strain and pressing service conditions.

While in the foregoing there has been illustrated and described such combination and arrangement of elements as constitute the preferred embodiment of my invention, it is nevertheless desired to emphasize the fact that my inventive concept is capable of wide and diverse application, to wit, any place where an improved bearing assembly is required, and therefore interpretation of the invention should only be conclusive when made in the light of the subjoined claims.

Having described my invention and its objects with such attention to detail as will thoroughly acquaint one skilled in the art with its construction and advantages, I claim:—

1. An adjustable bearing assembly comprising bearing brasses and a wedge shaped bushing, a plurality of wedge blocks mounted between the brasses and bushing and movable in a direction defined by their longitudinal axes, a plurality of rotatable wedging members formed with interengaging teeth and disposed in a plane at right angles to the blocks and operable thereupon to move the blocks whereby to adjust the position of the same between the brasses and bushing for the purpose defined.

2. An adjustable bearing assembly comprising bearing brasses and a wedge shaped bushing, a plurality of wedge blocks mounted between the brasses and bushing and movable in a direction defined by their longitudinal axes, a plurality of annular rotatable wedging members formed with interengaging teeth and disposed in a plane at right angles to the blocks, one of said wedging members being operatively connected with said blocks to adjust the positions of the same between the brasses and bushing, a retaining ring for holding the wedging members in place and adjustable locking members for holding the wedging members in a predetermined position.

3. The combination in a machine element formed with an opening for receiving a rotating member and provided with wear resisting brasses, the walls of the opening being formed with plural annular steps, of a wedge shaped bushing member carried in the opening, a plurality of annular wedging members seatable respectively on said steps, and wedge blocks between the brasses and bushing, said wedging members being operatively associated with said wedge blocks for adjusting the positions of the same between the brasses and the bushing.

4. An adjustable bearing assembly comprising interengaging toothed annular wedging members, one of said members being mounted for rotatable movement with respect to the other, spring means for holding one of said members against the other, wedge blocks each formed with recesses, one of said members being provided with an annular flange seatable in the recesses of the wedge blocks, a bushing, and said wedge blocks being mounted for movement in one direction only with respect to the bushing for the purpose defined.

In testimony whereof I affix my signature hereunto.

FRANK BRICKIE.